United States Patent
Noh et al.

(10) Patent No.: US 9,661,668 B2
(45) Date of Patent: May 23, 2017

(54) METHOD OF DEVICE TO DEVICE COMMUNICATION AND APPARATUS THEREOF

(71) Applicant: Electronics and Telecommunications Research Institute, Daejeon (KR)

(72) Inventors: Tae Gyun Noh, Daejeon (KR); Young Jo Ko, Daejeon (KR); Bang Won Seo, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 200 days.

(21) Appl. No.: 14/039,947

(22) Filed: Sep. 27, 2013

(65) Prior Publication Data

US 2014/0098759 A1    Apr. 10, 2014

(30) Foreign Application Priority Data

Sep. 28, 2012    (KR) .................. 10-2012-0109354
Sep. 27, 2013    (KR) .................. 10-2013-0115033

(51) Int. Cl.
*H04W 76/02*    (2009.01)
*H04W 72/04*    (2009.01)
*H04W 72/08*    (2009.01)
*H04L 1/00*     (2006.01)

(52) U.S. Cl.
CPC ......... *H04W 76/023* (2013.01); *H04L 1/0026* (2013.01); *H04W 72/0413* (2013.01); *H04W 72/082* (2013.01)

(58) Field of Classification Search
CPC ................................................ H04W 72/0413
See application file for complete search history.

(56) References Cited

U.S. PATENT DOCUMENTS

| | | | |
|---|---|---|---|
| 2005/0220068 A1* | 10/2005 | Kim | H04J 3/245 370/345 |
| 2010/0261469 A1 | 10/2010 | Ribeiro et al. | |
| 2012/0044922 A1* | 2/2012 | Ishii | H04L 5/001 370/338 |
| 2012/0134344 A1* | 5/2012 | Yu et al. | 370/336 |
| 2012/0163235 A1 | 6/2012 | Ho et al. | |
| 2012/0243431 A1 | 9/2012 | Chen et al. | |
| 2012/0257590 A1* | 10/2012 | Ishii | H04W 72/042 370/329 |

(Continued)

*Primary Examiner* — Robert M Morlan
*Assistant Examiner* — Nourali Mansoury
(74) *Attorney, Agent, or Firm* — Nelson Mullins Riley & Scarborough LLP

(57) ABSTRACT

A method of device-to-device (D2D) communication and apparatus thereof are provided. A communication method performed in a second device according to an embodiment of the present invention comprising: receiving first configuration information for receiving reference signal and second configuration information for transmitting channel state information from a base station; receiving the reference signal based on the first configuration information from the first device; generating the channel state information on a communication link between the first device and the second device based on the reference signal; and transmitting the channel state information based on the second configuration information to the base station. Accordingly, the D2D communication may be performed effectively.

4 Claims, 4 Drawing Sheets

(56) References Cited

U.S. PATENT DOCUMENTS

| | | | |
|---|---|---|---|
| 2012/0314611 A1* | 12/2012 | Baker | H04L 1/0026 370/252 |
| 2012/0320840 A1* | 12/2012 | Kim | H04L 5/001 370/329 |
| 2012/0320852 A1* | 12/2012 | Seo | H04L 1/0026 370/329 |
| 2013/0286882 A1* | 10/2013 | Lim | H04W 72/0406 370/252 |
| 2014/0031028 A1* | 1/2014 | Yamada et al. | 455/419 |
| 2014/0056230 A1* | 2/2014 | Dimou | 370/329 |
| 2014/0177585 A1* | 6/2014 | Jang et al. | 370/329 |
| 2014/0242995 A1* | 8/2014 | Lee | H04W 36/30 455/436 |
| 2015/0110020 A1* | 4/2015 | Li | H04B 7/0617 370/329 |

* cited by examiner

METHOD OF DEVICE TO DEVICE COMMUNICATION AND APPARATUS THEREOF

CLAIM FOR PRIORITY

This application claims priority to and the benefit of Korean Patent Application No. 10-2012-0109354 filed on Sep. 28, 2012 and No. 10-2013-0115033 filed on Sep. 27, 2013 in the Korean Intellectual Property Office (KIPO), the entire contents of which are hereby incorporated by reference.

BACKGROUND

1. Technical Field

Example embodiments of the present invention relate in general to a technology for device-to-device (D2D) communication, and more specifically, to method and apparatus to efficiently perform the D2D communication.

2. Related Art

In a cellular communication environment, a general method for devices to exchange data each other is a communication via a base station. That is, if a first device has data to be transmitted to a second device, the first device transmits the data to a first base station to which the first device is attached at first. Then, the first base station transmits the data received from the first device to a second base station to which the second device is attached. At last, the second base station transmits the data received from the first base station to the second device. Here, the first base station and the second base station may be the same base station or different base stations each other.

On the other hand, a device-to-device (D2D) communication may represent a direct communication between devices without a base station. That is, the first device can transmit the data to the second device directly without using the base station(s) for the above-mentioned instance.

SUMMARY

Accordingly, example embodiments of the present invention are provided to substantially obviate one or more problems due to limitations and disadvantages of the related art.

Example embodiments of the present invention provide a method of device-to-device (D2D) communication for reporting channel state information on a link of a D2D communication.

Example embodiments of the present invention also provide a method of D2D communication for transmitting control information on D2D communication.

In some example embodiments, a communication method performed in a second device comprising: receiving first configuration information for receiving reference signal and second configuration information for transmitting channel state information from a base station; receiving the reference signal based on the first configuration information from the first device; generating the channel state information on a communication link between the first device and the second device based on the reference signal; and transmitting the channel state information based on the second configuration information to the base station.

Here, the channel state information includes channel quality indication information.

Here, the channel quality indication information is generated on all bandwidth in which the reference signal is received and on a single codeword of the communication link when a transmission rank of the communication link is 1 and the single codeword is used for the communication link.

Here, the channel state information includes rank indication information.

Here, the rank indication information is generated on all bandwidth in which the reference signal is received based on the reference signal Here, the channel state information includes precoder matrix indication information and channel quality indication information.

Here, the precoder matrix indication information and the channel quality indication information are generated based on transmission layer and a number of codewords determined based on a transmission rank of the communication link.

Here, the channel state information on the communication link between the first device and the second device is transmitted to the base station using a physical channel for transmitting channel state information on downlink between the base station and the second terminal.

Here, the channel state information is transmitted to the base station using a transmission period and an offset different from a transmission period and an offset used for transmitting channel state information on downlink between the base station and the second terminal.

In other example embodiments, a communication method performed in a first device comprising: generating data indicator information to indicate whether at least one codeword to be transmitted to the second device is an initial transmitted codeword or not; transmitting a physical shared channel including the data indicator information and D2D data to the second device; and receiving a physical control channel in response to the physical shared channel from the second device.

Here, the physical shared channel further includes D2D control information comprising power control command information on the physical control channel.

Here, the physical control channel includes power control command information on the physical shared channel.

Here, the data indicator information are allocated to both symbols neighboring a symbol to which demodulation reference signal is allocated in the physical shared channel.

Here, the data indicator information are allocated to both symbols neighboring a symbol to which demodulation reference signal is allocated in the physical shared channel, and the D2D control information are allocated to both symbols neighboring the symbols to which the data indicator information are allocated.

In still other example embodiments, a communication method performed in a first device comprising: generating D2D control information including control information to be transmitted to the second device through a physical control channel; and transmitting a physical shared channel including the D2D control information and D2D data to the second device.

Here, the D2D control information includes response information for received data and power control command information on the physical shared channel when simultaneous transmission of the physical shared channel and the physical control channel for the second device is not allowed.

Here, the D2D control information includes response information for received data, power control command information on the physical shared channel, and power control command information on the physical control channel when simultaneous transmission of the physical shared channel and the physical control channel for the second device is allowed.

Here, the physical shared channel further includes data indicator information to indicate whether at least one codeword to be transmitted to the second device is an initial transmitted codeword.

Here, the data indicator information are allocated to both symbols neighboring a symbol to which demodulation reference signal is allocated in the physical shared channel.

Here, the data indicator information are allocated to both symbols neighboring a symbol to which demodulation reference signal is allocated in the physical shared channel, and the D2D control information are allocated to both symbols neighboring the symbols to which the data indicator information are allocated.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
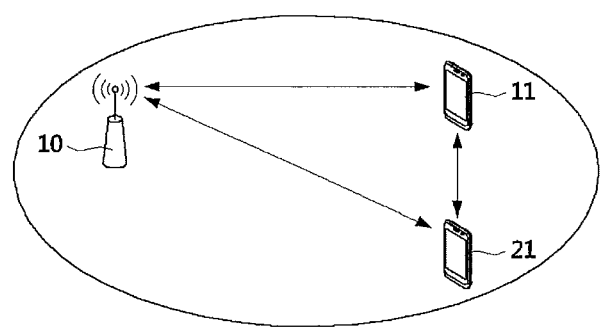
FIG. 1 is a conceptual diagram to depict an example embodiment for device-to-device (D2D) communication.

Example embodiments of the present invention are described below in sufficient detail to enable those of ordinary skill in the art to embody and practice the present invention. It is important to understand that the present invention may be embodied in many alternative forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

Hereinafter, preferred embodiments of the present invention will be described in detail with reference to the accompanying drawings. In the drawings and description, elements that appear in more than one drawing and/or elements that are mentioned in more than one place in the description are always denoted by the same respective reference numerals and are not described in detail more than once.

Hereinafter, example embodiments of the present invention will be described in detail with reference to the appended drawings. To aid in understating the present invention, like numbers refer to like elements throughout the description of the figures, and the description of the same component will not be reiterated.

In this specification, for example, a network may include wireless Internet such as a WiFi (Wireless Fidelity), portable Internet such as a WiBro (Wireless Broadband Internet) or WiMax (Wireless Broadband Internet), a 2G mobile radio communication network such as a GSM (Global System for Mobile communication) network or a CDMA (Code Division Multiple Access) network, a 3G mobile radio communication network such as a WCDMA (Wideband Code Division Multiple Access) network or a CDMA2000 network, a 3.5G mobile radio communication network such as a HSDPA (High Speed Downlink Packet Access) network or a HSUPA (High Speed Uplink Packet Access) network, a 4G mobile radio communication network such as an LTE (Long Term Evolution) network or an LTE-Advanced network, and a 5G mobile radio communication network, and so on.

Also in the specification, the base station may be a control apparatus to control a single cell. It may be considered that a physical base station includes a plurality of base stations, since the physical base station may control a plurality of cells in actual wireless communication system. That is, it may be considered that parameters allocated to each cell as different values each other are allocated by each base station.

Here, the base station may be an access point, a wireless radio access station, a node B, an evolved node B, a base transceiver station, a mobile multi-hop relay-BS, and so on, and may include all or some functions of the access point, the wireless radio access station, the node B, the evolved node B, the base transceiver station, the mobile multi-hop relay-BS, and so on.

Also in this specification, a device may be a mobile station, a mobile terminal, a subscriber station, a portable subscriber station, user equipment, an access terminal, and so on, and may include all or some functions of the mobile station, the mobile terminal, the subscriber station, the portable subscriber station, the user equipment, the access terminal, and so on.

Here, a desktop computer, a laptop computer, a tablet PC, a wireless phone, a mobile phone, a smart phone, an e-book reader, a PMP (portable multimedia player, a portable game machine, a navigation apparatus, a digital camera, a DMB (Digital Multimedia Broadcasting) player, a digital audio recorder, a digital audio player, a digital picture recorder, a digital picture player, a digital video recorder, a digital video player), and so on, which can communicate, may be used as the device.

FIG. 1 is a conceptual diagram to depict an example embodiment for device-to-device (D2D) communication Referring to FIG. 1, both a first device 11 and a second device 21 may perform the D2D communication, and may be located in cell coverage of a first base station 10. Each of the devices 11, 12 may exchange information for the D2D communication with the first base station 10.

Figure 2:
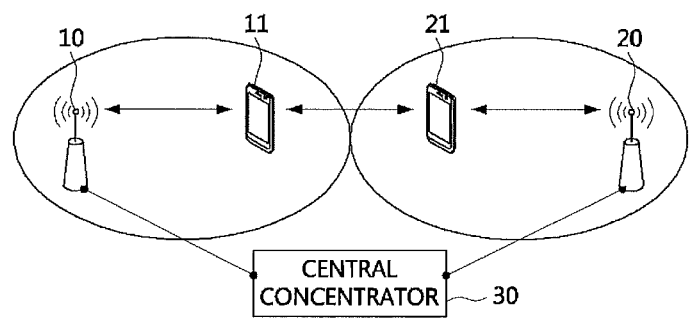
FIG. 2 is a conceptual diagram to depict another example embodiment for the D2D communication.

FIG. 2 is a conceptual diagram to depict another example embodiment for the D2D communication.

Referring to FIG. 2, both the first device 11 and the second device 21 may perform the D2D communication. The first device 11 may be located in cell coverage of the first base station 10, and the second device 21 may be located in cell coverage of the second base station 20. The first device 11 may exchange information for the D2D communication with the first base station 10, and the second device 21 may exchange the information for the D2D communication with the second station 20.

Both the first base station 10 and the second base station 20 may be connected to a central concentrator 30. The central concentrator 30 may concentrate information received from each of the base stations 10, 20, and may control the D2D communication based on the received information. The central concentrator 30 may be separately located with the base stations, or may be located in at least one of the base stations.

Comparing to a first case that two devices performing the D2D communication are attached to the same base station with a second case that two devices performing the D2D communication are attached to different base stations, both the first case and the second case are the same in terms that the first device 11 exchanges the information for the D2D communication with the first base station 10, and exchanges the information with the second device 21. Although the first case is different from the second case in terms that an entity (that is, the first base station 10 or the second base station 20) exchanging the information with the second device 21 is different, the information transmitted between the second device 21 and the first base station 10 may be the same as the information transmitted between the second device 21 and the second base station 20. Consequently, the information transmitted between the first device 11 and the second device 21 may be the same as the information transmitted between the device and the base station under both the first case and the second case in the D2D communication.

The D2D communication between two devices attached to different base stations will be described in a below example embodiment. However, the example embodiment may be also applied to the D2D communication between the two devices attached to the same base station unless the special case is specified.

The D2D communication may be classified by duplexing mode of a first communication link from the first device to the second device and a second communication link from the second device to the first device. When both the first communication link and the second communication link use the same frequency band and are divided in time domain, the D2D communication may be defined as 'a time division D2D communication'. When both the first communication link and the second communication link use different frequency bands and are divided in frequency domain, the D2D communication may be defined as 'a frequency division D2D communication'.

In a case that the communication between the device and the base station is configured to a time division duplexing (TDD) mode, the time division D2D communication may use only one of an uplink subframe and a downlink subframe, or may use both the uplink subframe and the downlink subframe among frequency bands used for the communication between the device and the base station, that is a cellular communication.

In a case that the communication between the device and the base station is configured to a frequency division duplexing (FDD) mode, the time division D2D communication may use only one of the uplink subframe and the downlink subframe, or may use both the uplink subframe and the downlink subframe among frequency bands dedicated for the communication between the device and the base station.

Also, the time division D2D communication may use frequency band different from the frequency band used for communication between the device and the base station (cellular communication).

In a case that the communication between the device and the base station is configured to the FDD mode, the frequency division D2D communication may use both the uplink frequency band and the downlink frequency band used for the communication between the device and the base station, or may use frequency band different from the frequency band used for the communication between the device and the base station.

Unless it is specially specified, hereinafter, only the communication link from the first device to the second device will be explained. That is, the first device may represent a device to transmit a data and the second device may represent a device to receive the data.

Figure 3:
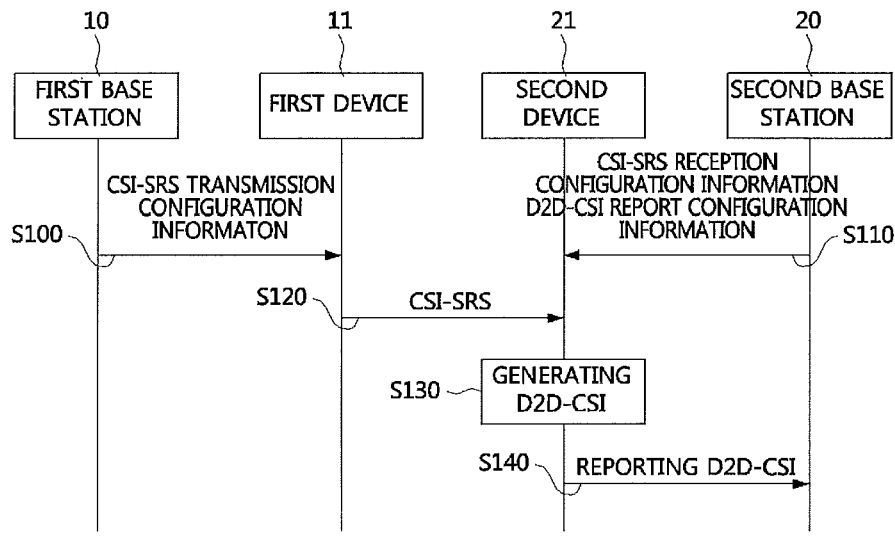
FIG. 3 is a sequence chart to depict an example embodiment for the D2D communication according to the present invention.

FIG. 3 is a sequence chart to depict an example embodiment for the D2D communication according to the present invention.

Referring to FIG. 3, both the first device 11 and the second device 21 may perform the D2D communication each other, and the first device 11 may be located in cell coverage of the first base station 10, and the second device 21 may be located in cell coverage of the second base station 20.

In the D2D communication, the base station may transmit resource allocation information, modulation and coding scheme (MCS) information, precoding information, and so on to the device. The base station may need channel state information (CSI) on the D2D communication link to perform adaptive transmission. The D2D communication link may be represented as 'D2D' and the CSI for the D2D may be represented as 'D2D-CSI' as below.

The first device 11 may transmit reference signal (RS) to the second device 21 so that the second device 21 can measure the D2D-CSI. The RS for measuring the D2D-CSI may be defined as 'channel state information-sounding reference signal' (CSI-SRS).

The first base station 10 may transmit the CSI-SRS configuration information related to transmission of the CSI-SRS to the first device 11 through upper layer signaling so that the first device 11 can transmit the CSI-SRS (S100). Here, the upper layer signaling may be radio resource control (RRC) signaling in the 3GPP. The CSI-RS configuration information used for transmitting the CSI-SRS may include resource allocation information, MCS information, precoding information, and so on.

The second base station 20 may transmit the CSI-RS configuration information related to reception of the CSI-SRS to the second device 21 through the upper layer signaling so that the second device 21 can receive the CSI-SRS, and may transmit the configuration information related to report of the D2D-CSI to the second device 21 through the upper layer signaling (S110). The CSI-RS configuration information used for receiving the CSI-RS may include the resource allocation information, the MCS information, the precoding information, and so on. The configuration information related to report the D2D-CSI may include resource allocation information, MCS information, and precoding information, and so on for transmitting D2D-CSI.

Here, it is described that the step S110 is performed after the step S100, however, performing sequence of the step S110 is not limited to above-mentioned instance. That is, the step S110 may be performed before the step S100 or may be performed with the step S100 at the same time.

In step S120, the first device 11 may transmit the CSI-SRS based on the CSI-RS transmission configuration information to the second device 21, and then the second device 21 may receive the CSI-SRS based on the CSI-RS reception configuration information from the first device 11.

The second device 21 may generate the D2D-CSI based on the received CSI-SRS (S130), and then may transmit the generated D2D-CSI based on the D2D-CSI report configuration information to the second base station 20 (S140).

On the other hand, an example embodiment of transmission configuration of the CSI-SRS may be similar to SRS (that is, 3GPP-SRS) in the 3GPP. However, the CSI-SRS configuration may be different from the SRS configuration of the 3GPP. The SRS configuration of the 3GPP may be classified into the cell-specific SRS configuration and the UE-specific SRS configuration. Similar to above-mentioned the SRS configuration of the 3GPP, the CSI-SRS configuration may be classified into the cell-specific CSI-SRS configuration and the UE-specific CSI-SRS configuration.

The CSI-SRS configuration transmitted from the base station to the device may basically include the UE-specific CSI-SRS configuration. Also, the CSI-SRS configuration may include the cell-specific CSI-SRS configuration, or may not include the cell-specific CSI-SRS configuration. When the CSI-RS configuration does not include the cell-specific CSI-SRS configuration, the device may use the cell-specific 3GPP-SRS configuration of cell to which one is attached instead of the cell-specific CSI-SRS configuration.

The device receiving the CSI-SRS may report the D2D-CSI to the base station periodically or non-periodically. The D2D-CSI report may be classified into some types according to information types included in the D2D-CSI. In the first type, the D2D-CSI report may include channel quality indicator (CQI) information for single codeword. In the second type, the D2D-CSI report may include rank indicator (RI) information. In the third type, the D2D-CSI report may include precoding matrix indicator information and each of CQI information for a plurality of codewords.

The base station may decide a MCS which will be used for the D2D communication based on the CQI information included in the reported D2D-CSI, may decide the number of layers used for the D2D communication link based on the RI information included in the reported D2D-CSI, and may decide precoding matrix used for the D2D communication link based on the precoding matrix indicator information included in the reported D2D-CSI.

The base station may inform the reporting type of the D2D-CSI to the device through the upper layer signaling. For example, the base station may request the device to perform the first type of the D2D-CSI report, or may request the device to perform both the second type of the D2D-CSI report and the third type of the D2D-CSI report.

Specifically, when the transmission rank of the communication link is 1 and a single codeword is used for the communication link in the first type of the D2D-CSI report, the device may generate the CQI information of the single codeword for all bandwidth in which the CSI-SRS is received.

In the second type of the D2D-CSI report, the device may generate the RI information for the all bandwidth in which the CSI-SRS is received. At this time, the device may use a plurality of CSI-SRS which may be transmitted in different bands.

In the third type of the D2D-CSI report, the device may assume the transmission rank based on the RI information calculated by the second type. The number of codewords assumed by the device may vary according to the transmission rank. For example, it is assumed that a single codeword is used for the communication link when the transmission rank is 1, and it is assumed that a plurality of codewords are used for the communication link when the transmission rank is greater than 1.

The device may assume the number of codewords and the transmission layers based on the transmission rank, and may simultaneously calculate the precoding matrix indicator information and CQI information for the all bandwidth in which the CSI-SRS is received. At this time, the device may calculate the CQI information for a single codeword when the transmission rank is 1, and may calculate the CQI information for a plurality of codewords when the transmission is greater than 1. When only a single precoding matrix corresponding to the transmission layer decided according to the transmission rank exists in precoding codebook, the device may assume the single precoding matrix to calculate the CQI information, and may exclude the precoding matrix indicator information from the D2D-CSI report.

The device may transmit the D2D-CSI generated in the above-mentioned manner to the base station. The physical channel used for transmitting the D2D-CSI may be the same as the physical channel used for transmitting the CSI on downlink between the base station and the device. However, a transmission period and an offset of the physical channel used for transmitting the D2D-CSI may be different from a transmission period and an offset of the physical channel used for transmitting the CSI on downlink between the base station and the device. Also, physical resources of the physical channel used for transmitting the D2D-CSI may be different from physical resources of the physical channel used for transmitting the CSI on downlink between the base station and the device.

In the D2D communication, the physical channel may include the physical data channel (that is, physical shared channel) and the physical control channel. The physical data channel used in the D2D communication may be defined as 'device-to-device physical shared channel' (D2D-PSCH), and the physical control channel used in the D2D communication may be defined as 'device-to-device physical control channel' (D2D-PCCH). The D2D data may be transmitted through the D2D-PSCH, and 'hybrid automatic repeat request-acknowledgment' (HARQ-ACK) for the D2D-PSCH may be transmitted through the D2D-PCCH. Here, the HARQ-ACK may indicate whether the D2D-PSCH is successfully received or not. That is, if the first device transmits the D2D-PSCH to the second device, the second device may transmit the D2D-PCCH in response to the D2D-PSCH to the first device.

Next, the power control for the D2D communication will be described as follows. The device which received the D2D-PSCH or the D2D-PCCH may obtain the reception power of the D2D-PSCH or the D2D-PCCH respectively, and then may control the transmission power of a device transmitting the D2D-PSCH or the D2D-PCCH by transmitting 'transmit power control command' (TPC) based on the obtained reception power of the D2D-PSCH or the D2D-PCCH. The TPC information for the D2D-PSCH may be defined as 'TPC-D2D-PSCH', and the TPC information for the D2D-PCCH may be defined as 'TPC-D2D-PCCH'.

For example, if the first device transmits the D2D-PSCH to the second device, the second device may transmit the D2D-PCCH in response to the D2D-PSCH. In this case, the second device may transmit the D2D-PCCH including the TPC-D2D-PSCH for the received D2D-PSCH to the first device. The first device receiving the D2D-PCCH may transmit the D2D-PSCH including the TCP-D2D-PCCH for the received D2D-PCCH to the second device.

The configuration of the D2D-PSCH will be described as follows. The D2D-PSCH may include 'new data indicator' (NDI) information and 'device-to-device control information' (D2D-CI). The NDI information may be an indiciation information to be used for determining whether the codeword to be transmitted to other device is an initial transmitted codeword or a retransmitted codeword. The no NDI information or no D2D-CI may be transmitted to the device according to scheduling manner of the D2D-PSCH. When the D2D-CI is transmitted through the D2D-PSCH, the D2D-CI may be configured to a combination of information on reception success or failure (that is, HARQ-ACK), TPC-D2D-PSCH, TPC-D2D-PCCH, and so on. The information included in the D2D-CI may be varied based on the case mentioned as below.

In a first case of transmitting the D2D-PSCH using the communication link from the first device to the second device, the first device may transmit the D2D-PSCH to the second device, and then the second device may transmit the D2D-PCCH in response to the received D2D-PSCH to the first device. In the first case, the first device may transmit the D2D-CI through the D2D-PSCH, and the D2D-CI may include the TPC-D2D-PCCH. The second device may transmit the TPC-D2D-PSCH through the D2D-PCCH to the first device.

In a second case of transmitting the D2D-PSCH using both the communication link from the first device to the second device and the communication link from the second device to the first device, each of the first device and the second device may simultaneously transmit the D2D-PSCH and D2D-PCCH. The first base station may inform the information on whether to allow simultaneous transmission of the D2D-PSCH and the D2D-PCCH to the first device (located in the cell coverage of the first base station) using the upper layer signaling. The second base station may inform the information on whether to allow simultaneous transmission of the D2D-PSCH and the D2D-PCCH to the second device (located in the cell coverage of the second base station) using the upper layer signaling.

When the simultaneous transmission of the D2D-PSCH and the D2D-PCCH is allowed, the device may simultaneously transmit the D2D-PSCH and the D2D-PCCH. On the other hand, when the simultaneous transmission of the D2D-PSCH and the D2D-PCCH is not allowed despite of need for the simultaneous transmission of the D2D-PSCH and the D2D-PCCH, the device may not transmit the D2D-PCCH and may transmit only the D2D-PSCH including the D2D-CI. In this case, the D2D-CI may include the information to be transmitted through the D2D-PCCH.

The D2D-CI configuration may be varied based on whether to allow the simultaneous transmission of the D2D-PSCH and D2D-PCCH for the first device and whether to allow the simultaneous transmission of the D2D-PSCH and D2D-PCCH for the second device.

It is assumed that each of the first device and the second device are required to simultaneously transmit the D2D-PSCH and the D2D-PCCH as follows. First, when the simultaneous transmission of the D2D-PSCH and D2D-PCCH for the first device is not allowed, the first device may generate the D2D-CI including the information to be transmitted through the D2D-PCCH, and then may transmit the D2D-PSCH including the generated D2D-CI.

When the simultaneous transmission of the D2D-PSCH and D2D-PCCH for the second device is not allowed, the second device may only transmit the D2D-PSCH. Therefore, the first device may generate the D2D-CI including the HARQ-ACK and the TPC-D2D-PSCH. On the other hand, when the simultaneous transmission of the D2D-PSCH and D2D-PCCH for the second device is allowed, the second device may simultaneously transmit the D2D-PSCH and the D2D-PCCH. Therefore, the first device may generate the D2D-CI including the HARQ-ACK, TPC-D2D-PSCH, and TPC-D2D-PCCH.

Next, the first device may simultaneously transmit the D2D-PSCH and the D2D-PCCH when the simultaneous transmission of the D2D-PSCH and the D2D-PCCH to the first device is allowed. In this case, when the simultaneous transmission of the D2D-PSCH and the D2D-PCCH for the second device is not allowed, the second device may only transmit the D2D-PSCH to the first device. Therefore, the first device does not transmit the D2D-CI. On the other hand, the second device may simultaneously transmit the D2D-PSCH and the D2D-PCCH when the simultaneous transmission of the D2D-PSCH and the D2D-PCCH for the second device is allowed. Therefore, the first device may transmit the D2D-CI including the TPC-D2D-PSCH.

Figure 4:
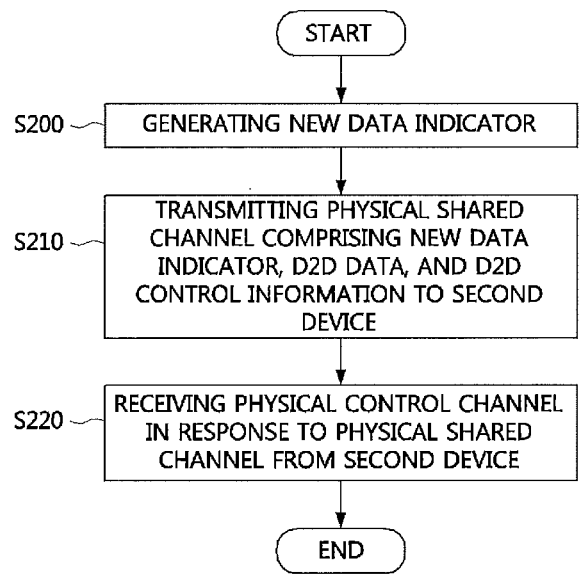
FIG. 4 is a flow chart to depict other example embodiment for the D2D communication according to the present invention.

FIG. 4 is a flow chart to depict other example embodiment for the D2D communication according to the present invention.

Referring to FIG. 4, both the first device and the second device may perform the D2D communication. The first device may transmit the D2D-PSCH (that is, physical shared channel) to the second device, and then the second device may transmit the D2D-PCCH (that is, physical control channel) in response to the received D2D-PSCH to the first device. Here, the first device and the second device may be attached to the same base station, or may be attached to different base stations.

The first device may generate the NDI information indicating whether the codeword to be transmitted to the second device is an initial transmitted codeword or not (S200). That is, the NDI information may indicate whether at least one codewords to be transmitted to the second device is the initial transmitted codeword or a retransmitted codeword.

The first device may transmit the physical shared channel including the NDI information and the D2D data to the second device (S210). The physical shared channel may further include the D2D-CI, and the D2D-CI may include the power control command information for the physical control channel (that is, TPC-D2D-PCCH) transmitted by the second device. Therefore, the second device receiving the physical shared channel may setup the transmission power of the physical control channel based on the TPC-D2D-PCCH included in the D2D-CI.

The first device may receive the physical control channel in response to the physical shared channel from the second device (S220). The physical control channel may include the power control command information and HARQ-ACK for the physical shared channel (that is, TPC-D2D-PSCH) transmitted by the first device. Therefore, the first device may setup the transmission power of the physical shared channel based on the TPC-D2D-PSCH.

Here, the NDI information may be allocated to both symbols neighboring a symbol to which the demodulation reference signal is allocated in the physical shared channel, and the D2D-CI may be allocated to symbol neighboring the symbols to which the NDI information are allocated. The D2D-PSCH configuration including the NDI information and the D2D-CI will be described by referring to FIG. 5 to FIG. 7 as below.

Figure 5:
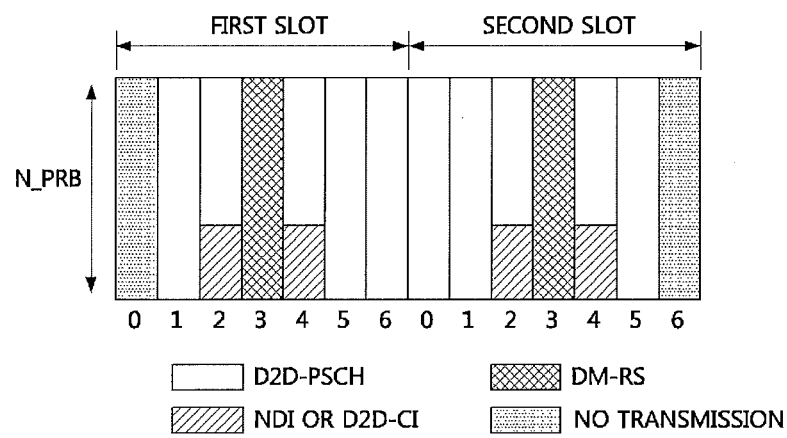
FIG. 5 is a conceptual diagram to depict an example embodiment for a configuration of D2D-physical shared channel (D2D-PSCH) according to the present invention.
Figure 6:
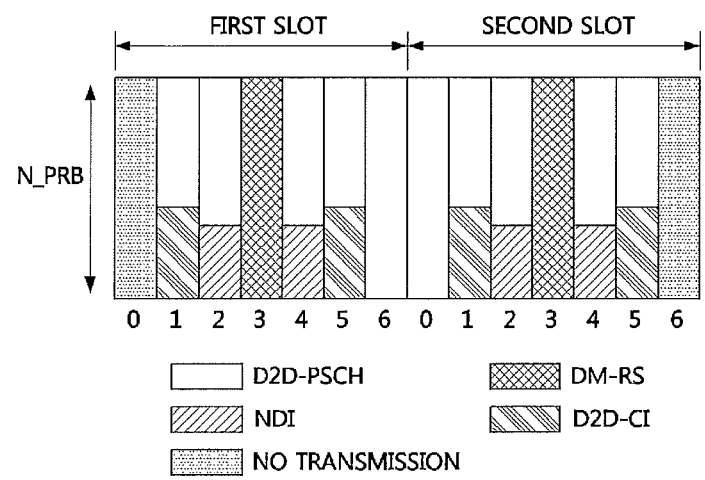
FIG. 6 is a conceptual diagram to depict another example embodiment for a configuration of the D2D-PSCH according to the present invention.
Figure 7:
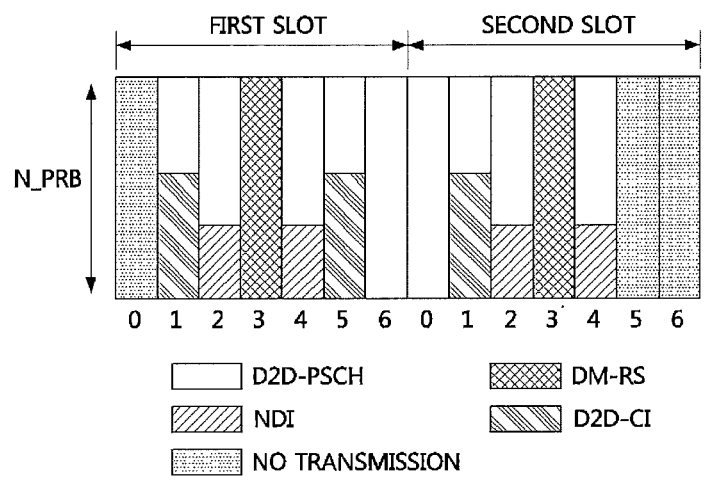
FIG. 7 is a conceptual diagram to depict still another example embodiment for a configuration of the D2D-PSCH according to the present invention.

FIG. 5 is a conceptual diagram to depict an example embodiment for a configuration of D2D-physical shared channel (D2D-PSCH) according to the present invention. FIG. 6 is a conceptual diagram to depict another example embodiment for a configuration of the D2D-PSCH according to the present invention. FIG. 7 is a conceptual diagram to depict still another example embodiment for a configuration of the D2D-PSCH according to the present invention;

Referring to FIG. 5 to FIG. 7, the D2D-PSCH may include a plurality of symbols on time domain and a plurality of physical resource blocks (PRBs) on frequency domain. The subframe of the D2D-PSCH may include the first slot and the second slot, the locations on the frequency through which each slot is transmitted may be different each other. The each slot may comprise 7 symbols, and first symbol in the first slot and last symbol (that is, seventh symbol) in the second slot may be not used for transmission. The demodulation reference signal (DM-RS) used for demodulation of the D2D-PSCH may be allocated to the middle of the each slot.

Both the NDI information and the D2D-CI, or one of the NDI information and the D2D-CI, or no NDI information and no D2D-CI may be transmitted through the D2D-PSCH.

When the NDI information or the D2D-CI is transmitted, the NDI information or the D2D-CI may be allocated to the both symbols neighboring the symbol to which the DM-RS is allocated as the configuration depicted in FIG. 5. For example, when the DM-RS is allocated to fourth symbol in the slot, the NDI information or the D2D-CI may be allocated to third symbol and fifth symbol in the slot.

When both the NDI information and the D2D-CI are transmitted, the NDI information may be allocated to the both symbols neighboring the symbol to which the DM-RS is allocated as the configurations depicted in FIGS. 6 and 7, and the D2D-CI may be allocated to symbol neighboring the symbols to which the NDI information are allocated.

For example, when the first symbol in the first slot and the last symbol in the second slot are not used for transmission, the NDI information may be allocated to third and fifth symbols and the D2D-CI may be allocated to second and sixth symbols if the DM-RS is allocated to forth symbol in the first slot and the second slot.

On the other hand, when first symbol in the first slot and sixth and seventh symbols in the second slot are not used for transmission, the NDI information may be allocated to third and fifth symbols in the first slot and the D2D-CI may be allocated to second and sixth symbols in the first slot if the DM-RS is allocated to forth symbol in the first slot. The NDI information may be allocated to third and fifth symbols in the second slot and the D2D-CI may be allocated to second symbol in the second slot, if the DM-RS is allocated to forth symbol in the second slot.

Figure 8:
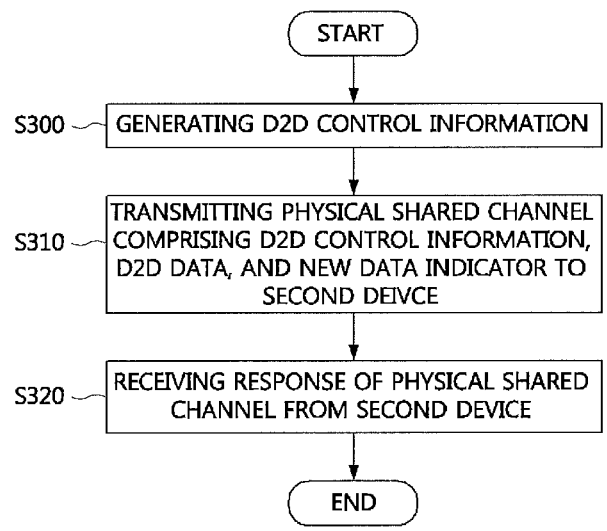
FIG. 8 is a flow chart to depict another example embodiment for the D2D communication according to the present invention.

FIG. 8 is a flow chart to depict another example embodiment for the D2D communication according to the present invention.

Referring to FIG. 8, both the first device and the second device may perform the D2D communication. The first device and the second device may be attached to the same base station, or may be attached to different base stations.

When the simultaneous transmission of the physical shared channel (that is, D2D-PSCH) and the physical control channel (that is, D2D-PCCH) for the first device is not allowed, the first device may generate the D2D-CI including control information to be transmitted to the second device through the physical control channel (S300).

At this time, when the simultaneous transmission of the physical control channel and the physical shared channel for the second device is not allowed, the first device may generate the D2D-CI including the response information (that is, HARQ-ACK) in response to reception of data and the power control command information for the physical shared channel (that is, TPC-D2D-PSCH). On the other hand, when the simultaneous transmission of the physical control channel and the physical shared channel for the second device is allowed, the first device may generate the D2D-CI including the response information in response to reception of data, the power control command information for the physical shared channel (that is, TPC-D2D-PSCH), and the power control command information for the physical control channel (that is, TPC-D2D-PCCH).

The first device may transmit the physical shared channel including the D2D-CI and the D2D data (S310). Here, the physical shared channel may further include the NDI information indicating to whether at least one codewords to be transmitted to the second device is the initial transmitted codeword or not. The NDI information may indicate to whether at least one codewords to be transmitted to the second device is the initial transmitted codeword or the retransmitted codeword.

The first device may receive response of the physical shared channel from the second device (S320). When the simultaneous transmission of the physical shared channel and the physical control channel for the second device is allowed, the first device may receive the physical shared channel and the physical control channel from the second device. On the other hand, when the simultaneous transmission of the physical shared channel and the physical control channel for the second device is not allowed, the first device may receive the physical shared channel from the second device.

Here, the NDI information may be allocated to the both symbols neighboring the symbol to which the DM-RS is allocated, and the D2D-CI may be allocated to the symbol neighboring the symbols to which the NDI information are allocated. That is, the NDI information and the D2D-CI may be allocated to the locations depicted in FIG. 5 to FIG. 8.

According to the present invention, the D2D communication may be performed effectively.

While the example embodiments of the present invention and their advantages have been described in detail, it should be understood that various changes, substitutions and alterations may be made herein without departing from the scope of the invention.

What is claimed is:

1. A communication method performed in a first device for supporting device-to-device (D2D) communication between the first device and a second device, the method comprising:
   generating data indicator information to indicate whether at least one codeword of D2D data is initially transmitted or is retransmitted to the second device;
   generating a physical shared channel including the data indicator information and the D2D data;
   transmitting the physical shared channel to the second device; and
   receiving a physical control channel in response to the physical shared channel from the second device,
   wherein the data indicator information are allocated to both symbols neighboring a symbol to which demodulation reference signal is allocated in the physical shared channel.

2. The method of claim 1, wherein the D2D control information further includes power control command information on the physical control channel.

3. The method of claim 1, wherein the physical control channel includes power control command information on the physical shared channel.

4. The method of claim 1, wherein, when a demodulation reference signal is allocated to n-th symbol of a slot included in the physical shared channel, the data indicator information are allocated to (n−1)-th and (n+1)-th symbols in the slot included in the physical shared channel, and the D2D control information are allocated to (n−2)-th and (n+2)-th symbols in the slot included in the physical shared channel.

* * * * *